(12) United States Patent
Arant

(10) Patent No.: US 7,325,195 B1
(45) Date of Patent: Jan. 29, 2008

(54) ADJUSTABLE-SPEED ELECTRONIC METHOD OF COMPOSING INFORMATION

(76) Inventor: Gene W. Arant, PO Box 269, Lincoln City, OR (US) 97367

( * ) Notice: Subject to any disclaimer, the term of this patent is extended or adjusted under 35 U.S.C. 154(b) by 0 days.

(21) Appl. No.: 09/397,325

(22) Filed: Sep. 16, 1999

Related U.S. Application Data

(60) Provisional application No. 60/104,972, filed on Oct. 20, 1998.

(51) Int. Cl.
G06F 15/00 (2006.01)

(52) U.S. Cl. .................. 715/531; 715/830; 715/834

(58) Field of Classification Search .......... 707/531, 707/526, 529; 345/730, 830–834; 715/526, 715/529–531, 830–834
See application file for complete search history.

(56) References Cited

U.S. PATENT DOCUMENTS

| | | |
|---|---|---|
| 346,656 A | 8/1886 | Hopkins |
| 502,101 A | 7/1893 | LePlongeon |
| 3,771,156 A | 11/1973 | Watts et al. |
| 4,320,395 A | 3/1982 | Meissen et al. |
| 4,491,834 A * | 1/1985 | Oguchi .................. 345/467 |
| 4,558,315 A | 12/1985 | Weiss et al. |
| 4,836,670 A * | 6/1989 | Hutchinson ............. 351/210 |
| 4,912,462 A | 3/1990 | Washizuka et al. |
| 4,951,033 A * | 8/1990 | Sakaguchi ............... 345/160 |
| 4,979,094 A * | 12/1990 | Gemmell et al. ............ 700/83 |
| 5,125,078 A | 6/1992 | Matsuda et al. |
| 5,215,466 A | 6/1993 | Rubio |
| 5,559,512 A | 9/1996 | Jasinski et al. |
| 5,646,821 A * | 7/1997 | Sun ........................ 361/683 |
| 5,812,117 A * | 9/1998 | Moon ...................... 345/169 |
| 5,841,373 A | 11/1998 | Mason |
| 5,889,893 A * | 3/1999 | Robson ................... 382/296 |
| 5,943,039 A * | 8/1999 | Anderson et al. .......... 715/810 |
| 6,005,601 A * | 12/1999 | Ohkura et al. ............. 725/52 |
| 6,011,542 A * | 1/2000 | Durrani et al. ............ 345/156 |
| 6,028,600 A * | 2/2000 | Rosin et al. .............. 345/718 |
| 6,351,273 B1 * | 2/2002 | Lemelson et al. ......... 345/786 |
| 6,421,064 B1 * | 7/2002 | Lemelson et al. ......... 345/688 |
| 6,567,072 B2 * | 5/2003 | Watanabe ................. 345/161 |
| 6,810,504 B2 * | 10/2004 | Cooper et al. ............ 715/535 |

OTHER PUBLICATIONS

Wordperfect 6.1, word insert screendumps, (1996).*
"Mavis Beacon Teaches Typing" manual, Software Toolworks, 1987, pp. 1-4.*

* cited by examiner

*Primary Examiner*—Cesar B Paula

(57) ABSTRACT

A method of composing information by electronically advancing a sequence of information elements at controlled speed in an even step-wise fashion into a fixed transfer location while visibly displaying each of them there during a dwell time to permit the operator to decide whether to select it for manually directed copying into an output sequence. The speed of advance of the sequence of information elements and hence the dwell time for display of each information element is manually adjusted from time to time.

7 Claims, 1 Drawing Sheet

ADJUSTABLE-SPEED ELECTRONIC METHOD OF COMPOSING INFORMATION

RELATED APPLICATION

This application claims the priority of my U.S. Provisional Application Ser. No. 60/104,972 filed Oct. 20, 1998.

FIELD OF THE INVENTION

The present invention relates to educational processes, and particularly to the development of creative faculties for the composition of alphabetical, numerical, alphanumeric, literary, or other information.

BACKGROUND OF THE INVENTION

A great deal of effort is now devoted to applying the most effective methods in the teaching of young children. The recent explosion in computer and communications technology has served to accelerate these efforts. Nevertheless, there remain possible approaches to the problem that either have not been explored as fully as they should be, or else have not even been recognized or suggested.

SUMMARY OF THE INVENTION

According to the present invention information is made available in the form of a plurality or set of discrete segments, and a method is then provided for selecting various ones of the information segments in order to create an information body that did not exist before.

More specifically, the invention provides a set of information segments arranged into an input sequence. An information transfer location is then identified, and the input sequence of information segments is repetitively moved past the transfer location while visually displaying at least those segments that are approaching the transfer location. Selected ones of the information segments are then copied as they arrive at the transfer location. The information segment copies are then arranged into an output sequence that constitutes a meaningful information body.

In accordance with the invention an "information segment" may be a digit, a subset of digits, or a number; a letter of the alphabet, a combination of letters, or a word; or any other representation of information that is capable of forming a building block from which a meaningful information body may be created. A "meaningful information body" may be a number, a word, a sentence, or the like.

Apparatus for carrying out the method of the invention preferably includes electronic devices such as light emitting diodes (LED's) for visually displaying the information segments, electronic circuit means for controlling the movement of the visually displayed information segments, control devices for controlling operation of the electronic circuit means, and manually operated selection means for actuating the copying of selected ones of the information segments as they arrive at the transfer location.

DETAILED DESCRIPTION

Figure 1:
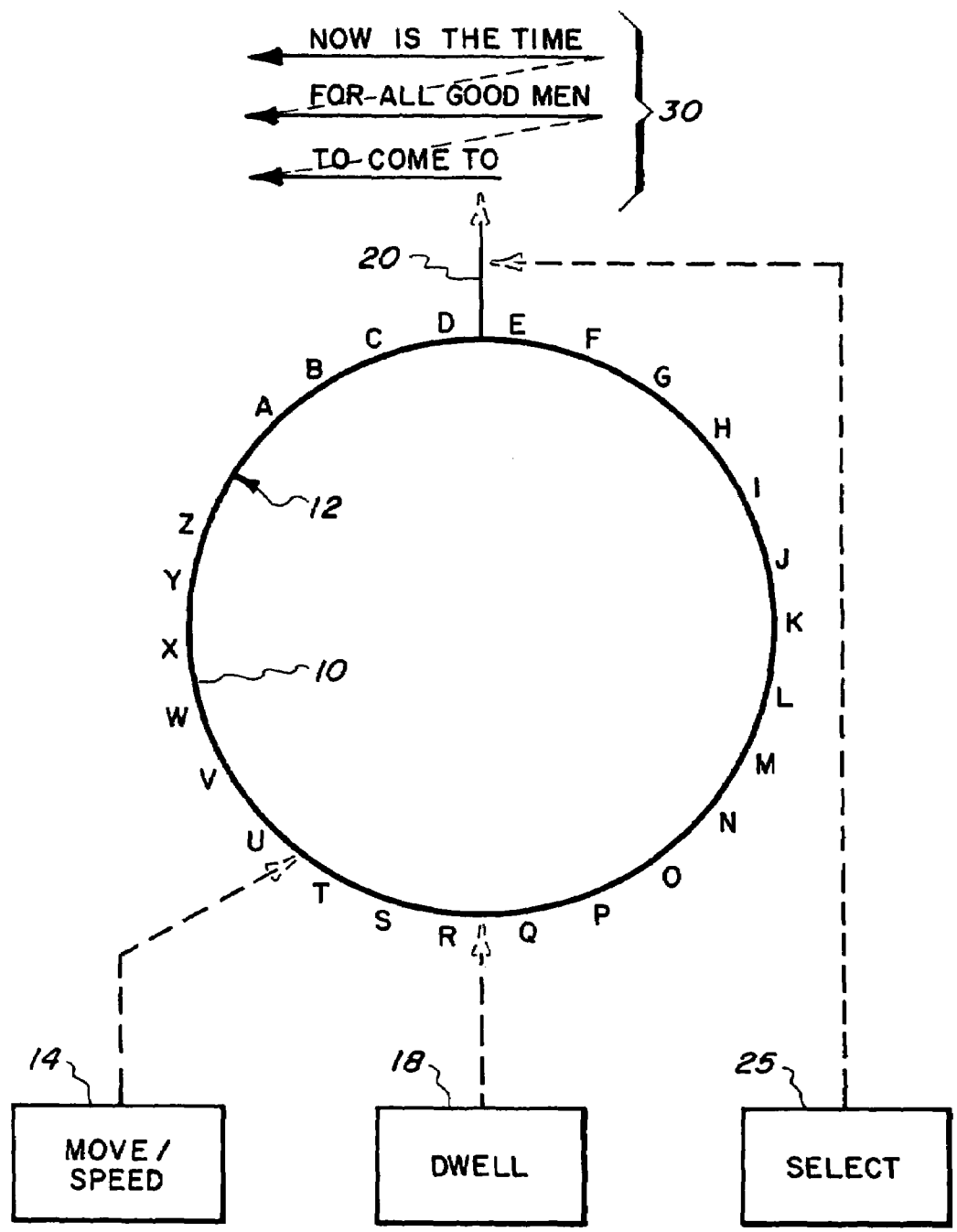
FIG. 1 shows an example of the letter input method of this invention.

Referring now to FIG. 1, the sole drawing figure, the letters A, B, C, . . . X, Y, Z of the alphabet are shown as being arranged in sequence around a circular path 10. An arrow 12 indicates that the letters of the alphabet rotate repetitively along the circular path 10. An electronic control box 14 controls the starting, stopping, and speed of movement of the alphabetical characters around the circular path 10.

A line 20 represents an information transfer, or copying, location, which the alphabetical letters repeatedly pass as long as the movement continues. A control box 18 provides a selection of dwell time for each letter of the alphabet as it arrives at transfer location 20. That is to say, a selection may be made that each alphabetical letter is to pause for perhaps one second, or two seconds, or even five seconds, as it reaches the transfer location, allowing the operator a finite amount of time within which to accomplish the copying of that letter.

On the other hand, if the alphabet is moving relatively slowly, the operator may wish to reduce the dwell time essentially to zero, making it necessary to copy each letter "on the fly", so to speak. This aspect of the operation may make it an exciting toy or game of skill, especially for young children.

Box 25 indicates the "select" button, which must be manually actuated to transfer each letter. Display area 30 at the top of the figure indicates that the operator has chosen to write the well known phrase:

"Now is the time for all good men to come to the aid of the country."

However, the last five words of that sequence have not as yet been selected.

Although the circular path 10 does not specifically show the locations of spaces, it will be understood that any desired number of blank spaces may be included among the sequence of letters; or, for that matter, the "select" button 25 may be provided with a "double-click" type of action to create a space as desired.

While the illustration in FIG. 1 shows only the process of composing words from letters of the alphabet, it will be understood that the same process may be used to select digits to form numbers. Furthermore, the input sequence of information segments need not necessarily be arranged in a meaningful sequence, because according to the invention the significant feature is that the operator has the opportunity to make the appropriate selections so that the output sequence is meaningful.

Although FIG. 1 illustrates the movement of the letters of the alphabet around a circular path, the present invention is not thus restricted, because it is only necessary that the input sequence of information segments be repetitively moved past the information transfer location, with the segments approaching that location being visible to the operator so that he or she can make appropriate selections to create the output sequence constituting a meaningful information body.

As a further feature of the invention, provision may be made to review and correct the information body that constitutes the output.

I claim:

1. An electronically controlled method of selecting and copying selected information segments from an input series of information segments so as to create an output sequence constituting a new information body, comprising the steps of:

(a) utilizing an electronic apparatus fo establish a transfer location into which all of the information segments are to pass in sequence;
(b) utilizing the electronic apparatus to set a dwell time for each of the successive information segments to pause in the transfer location;
(c) moving the input series of information segments into and through the transfer location and visibly displaying each information segment in the transfer location during that dwell time;
(d) as the information segments occupy the transfer location, copying selected ones of them into the output sequence;
(e) at the end of each dwell time interval, allowing the next succeeding information segment in the input series to enter the transfer location;
(f) after such movement of the input series, from time to time manually controlling the apparatus to select a different dwell time; and
(g) after the change in dwell time, again moving the input series into and through the transfer location so that during such further passage of the input information segments the time available to the operator for deciding upon each prospective transfer is the thus-modified dwell time.

2. The method of claim 1 wherein the information segments in the input sequence are also visibly displayed as they are approaching the transfer location.

3. The method of claim 1 wherein each information segment is an alphanumeric character.

4. The method of claim 2 wherein each information segment is an alphanumeric character.

5. The method of claim 1 wherein after the change in setting of the dwell time the input sequence is repetitively moved into and through the transfer location.

6. The method of claim 5 wherein the information segments are also visibly displayed as they approach the transfer location.

7. The method of claim 5 wherein each information segment is an alphanumeric character.

* * * * *